US011170156B1

(12) United States Patent
Arora et al.

(10) Patent No.: US 11,170,156 B1
(45) Date of Patent: Nov. 9, 2021

(54) DROP WORD TOOL FOR DIGITAL TYPESETTING

(71) Applicant: ADOBE INC., San Jose, CA (US)

(72) Inventors: Aman Arora, New Delhi (IN); Rohit Kumar Dubey, Rajasthan (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/089,950

(22) Filed: Nov. 5, 2020

(51) Int. Cl.
*G06F 40/109* (2020.01)
*G06F 3/0484* (2013.01)
*G06F 3/0482* (2013.01)

(52) U.S. Cl.
CPC .......... *G06F 40/109* (2020.01); *G06F 3/0482* (2013.01); *G06F 3/04847* (2013.01)

(58) Field of Classification Search
CPC .................................................. G06F 40/109
See application file for complete search history.

(56) References Cited

PUBLICATIONS

"Dropword III: An InDesign Script for Hebrew Typesetting", Id-Extras.com (captured Oct. 29, 2020), https://www.id-extras.com/products/dropword/.*

"Drop caps and nested styles", Adobe InDesign CS6 User Guide (Jan. 2, 2017), https://helpx.adobe.com/au/indesign/using/drop-caps-nested-styles.html.*

"Drop Words", in-tools.com (Jan. 9, 2011), http://in-tools.com/downloads/docs/DropWords.pdf.*

Blatner, David, "Creating Dropwords with InDesign", CreativePro.com (May 14, 2015), https://creativepro.com/creating-dropwords-indesign/.*

Adobe InDesign CS6 Plug-In Programming Guide vol. 1: Fundamentals. (2012). 453 pages. Retrieved from the Internet at<https://www.adobe.com/content/dam/acom/en/devnet/indesign/sdk/cs6/plugin/plugin-programming-guide-vol1.pdf>.

* cited by examiner

*Primary Examiner* — Asher D Kells
(74) *Attorney, Agent, or Firm* — Shook, Hardy & Bacon L.L.P.

(57) ABSTRACT

Embodiments provide systems, methods, and computer storage media for applying a drop word effect to text in a digital design or document. A word drop tool accepts configurable parameters such as the number of starting words to be dropped, the number of lines to drop and a text style to apply to the starting word(s), and automatically applies a drop word effect to a target text field or paragraph. To create the effect, the drop word tool reads text content from the target text, identifies the starting words to be dropped, applies a designated text style to the starting words, and generates a text exclusion zone for an empty space below the starting word(s). Tiles that indicate permissible regions of lines where text may flow are trimmed to carve out portions that overlap with the text exclusion zone, and text is flowed into the trimmed tiles.

20 Claims, 14 Drawing Sheets

DROP WORD TOOL FOR DIGITAL TYPESETTING

BACKGROUND

In typography, the visual aesthetics of text within a document is one of the primary concerns. One way to contribute to the visual aesthetics of text is with spacing. There are a variety of ways to add space to text, including spacing between words, letters (tracking or kerning), and lines (leading). Proper spacing helps focus attention on the words in text content, while line spacing and letter spacing can help make text more readable. Related text features, such as the number of words in a line, the number of lines in a page, and the amount of corresponding content on a page, can also contribute to document clarity and readability. As a result, spacing is one of the primary tools in a typesetter's tool belt.

SUMMARY

Embodiments of the present invention are directed to a drop word tool for digital typesetting. A drop word is a text feature in which an empty space is created below a starting word in a text field or paragraph (for horizontal text) in order to emphasize the starting word. In some embodiments, a design, typesetting, and/or word processing application includes a drop word tool that allows a user to select a target text field or paragraph, specify a number of configurable drop word settings, and automatically apply a drop word effect to the target text field or paragraph.

In some embodiments, a drop word tool causes presentation of a menu of configurable drop word settings, or otherwise exposes a number of configurable settings. For example, the menu may accept user input specifying the number of starting words to be dropped, the number of lines to drop, and/or a text style to apply to the starting word(s). In some embodiments, the menu may additionally or alternatively accept user input selecting an option to automatically scale the starting word to prevent its descenders from colliding with the next line, an option to include the terminating space in the length of the empty space of the drop word, and/or an option to apply the drop word settings to the current paragraph style and automatically replicate the drop word effect to any paragraph with the same style. When the user is finished configuring the settings, the drop word tool automatically applies a drop word effect to the target text field or paragraph using the configured settings.

In some embodiments, to create the drop word effect, the drop word tool reads the text content from the target text field or paragraph, identifies the starting words to be dropped (e.g., by reading the text content and terminating upon reaching a number of space characters corresponding to the designated number of words), and applies a designated text style to the starting words. In some embodiments, the drop word tool calculates the size and location of a text exclusion zone for the empty space below a drop word (for horizontal text). Generally, the dimensions and location of the text exclusion zone may depend on the text direction, the number of dropped word(s), the span of the dropped word(s), whether or not to include a terminating space, and/or line number (e.g., line height). In an example embodiment for left-to-right text, a text exclusion zone is generated to cover the lines below the starting word(s). The target text field or paragraph is then updated using the newly created text exclusion zone. For example, tiles that indicate permissible regions of the lines where text may flow may be trimmed to carve out portions that overlap with the text exclusion zone, and text may be flowed into the trimmed tiles. As such, a desired drop word effect is automatically applied to a target text field or paragraph.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Overview

One text feature that can contribute to visual aesthetics, clarity, and readability is known as a dropped capital ("drop cap"). A drop cap is a large capital letter used as a decorative element at the beginning of a paragraph or section. The size of a drop cap is usually two or more lines. Drop caps are used in various media, including books, newspaper articles, documents, and web pages. Drop caps are typically used to add style or grab a reader's attention.

Figure 1:
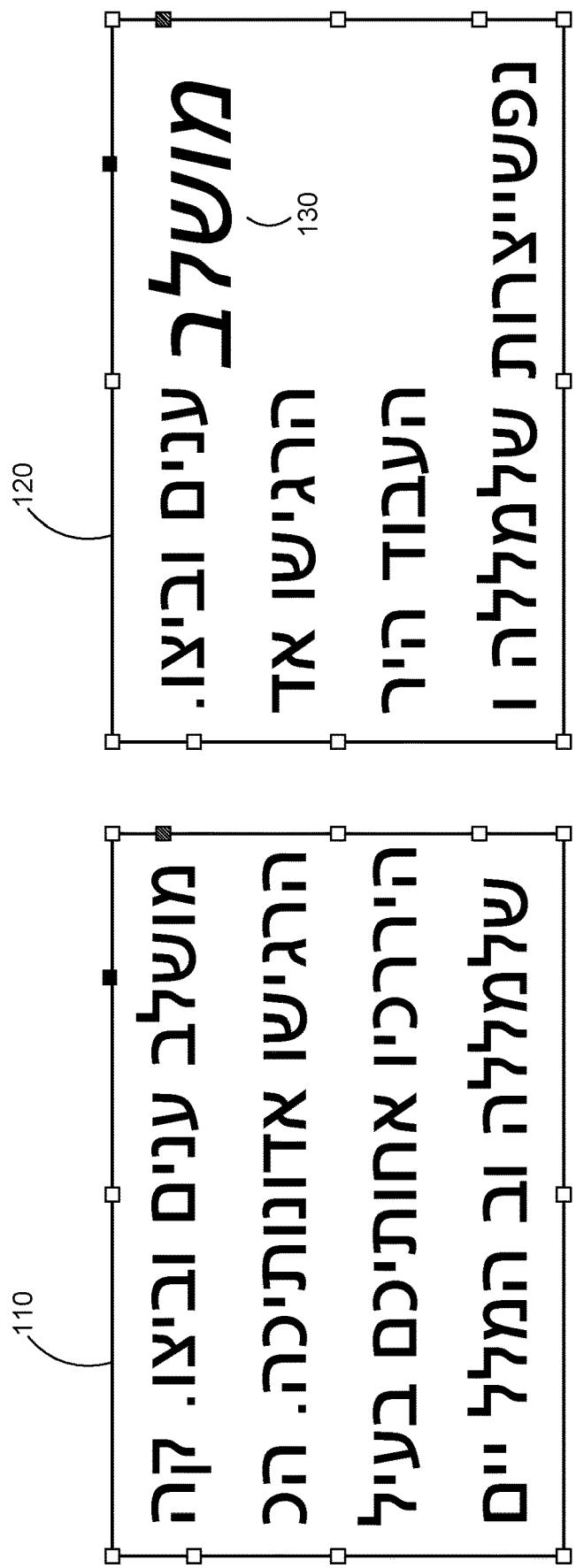
FIG. 1 is an illustration of an example drop word effect, in accordance with some embodiments.

Another text feature that can contribute to visual aesthetics, clarity, and readability is referred to herein as a dropped word (or "drop word"). Instead of increasing the size of a starting character like a drop cap, a drop word "drops" a starting word at the beginning of a paragraph or section by creating an empty space for the word in the lines below it, with or without increasing the size of the starting word. The empty space in a drop word provides a limited gap in a paragraph that serves to highlight a starting word of the paragraph. As a result, the spatial aesthetic created by drop words can add clarity while helping preserve paper space. Drop words are popular in Hebrew and Middle Eastern typesetting and are gaining popularity in Roman languages. The drop word is especially helpful for Hebrew text, as the drop word can accommodate the vowels that appear beneath characters in the Hebrew language (nikudot). Once the size of a starting Hebrew character is increased, the vowels below the character also grow, so more leading is typically needed to avoid a collision with the next line. Conventionally, the second line is indented to avoid this issue, creating the drop word effect. FIG. 1 is an illustration of an example drop word effect applied to text field 110, resulting in text field 120 with drop word 130.

Generally, drop words can help reduce conflicts between lines of text when the size of the starting word is larger than the other text in the paragraph. These conflicts can arise in various situations. For example, many publications in Hebrew and Arabic increase the size of starting words in a paragraph, while typically maintaining a tight leading. The drop word effect is often used in Jewish prayer books (siddurim) to highlight the first word of each prayer, which is the name by which the prayer is known. In situations like these, the added space from a drop word helps reduce conflicts between descenders of the drop word and ascenders of the line below.

Although some design, typesetting, and word processing applications include a drop cap tool that allows users to automatically format a drop cap in text, current software tools lack a dedicated typesetting feature that can implement a drop word. Moreover, existing workarounds are inefficient, cumbersome, and ineffective. For example, in some cases, a drop cap tool may be repurposed and used in a multi-step process in an attempt to recreate a drop word effect. However, since the layouts of drop caps and drop words are different, repurposing existing drop cap tools is inefficient, tedious, and often cannot recreate the desired effect. For example, drop caps are generally applied to the first letter and drop words are applied to whole words, but conventional drop cap tools are typically not capable of increasing the size of an entire word. A potential workaround is to create a character style with a desired text size, and create a paragraph style that applies a drop cap with the character style to each letter of the word to be dropped. However, this custom paragraph style only works to drop words with the same number of characters, so multiple paragraph styles have to be created with drop caps defined for different starting word lengths (e.g., one paragraph style for each length of word to be dropped). Furthermore, this workaround requires a large number of styles, significant manual effort including trial and error setup, needs to be redone when the text is changed, and is error prone and impractical at scale.

To highlight some other challenges and inefficiencies in adapting drop cap and other existing tools to mimic a drop word effect, drop caps typically span multiple lines of text, whereas the starting word in a drop word often only takes up the first line. To create the space below the starting word, users can manually insert an indent into the text stream, a process that is not only tedious, but often needs to be redone when the text is changed. Furthermore, drop words often include a terminating space along with the starting word to determine the size of the space to create below. This feature is not available using drop cap tools. One possible workaround is for the user to create a dummy object below the starting word and apply a suitable text wrap to the dummy object. However, as with other workarounds, this work often needs to be redone or adjusted in response to changes in text.

Currently, there is no easy way to create a drop word effect using existing digital typesetting tools, and the current techniques all suffer from a variety of drawbacks. Generally, a drop word created using conventional techniques does not flow with the text. As a result, when the text is edited, font or style is changed, or a containing text field is modified in certain ways, the drop word effect is broken, and the effect needs to be adjusted or recreated. Moreover, replicating a drop word effect across many paragraphs compounds the inefficiencies, and in many cases is impractical. As such, there is a need for a dedicated drop word tool in design, typesetting, and word processing applications.

Accordingly, embodiments of the present invention are directed to a drop word tool for digital typesetting. In an example implementation, the drop word tool exposes a variety of configurable settings that allow a user to control different elements of a drop word effect. Example configurable settings include the number of starting words to be dropped, the number of lines to drop, character style to apply to the starting word(s), an option to automatically scale the starting word to prevent its descenders from colliding with the next line, an option to include the terminating space in the length of the empty space of the drop word, and an option to apply the drop word settings to the current paragraph style and automatically replicate the drop word effect to any paragraph with the same style. When a user applies a drop word effect on a target paragraph in a target text field, the drop word tool automatically creates a drop word using the selected settings by creating an invisible text exclusion zone in the target text field, updating the tiles in the target text field where text can flow, and flowing the text of the target paragraph into the tiles.

More specifically, in order to create a drop word effect, the drop word tool may access, create, and/or edit one or more data structures that represent various aspects of the target text field, such as an arrangement of lines and paragraphs in the target text field, tiles indicating areas of the lines where text can flow, text content for the target text field, and an arrangement and allocation of the text content into the lines. For example, the drop word tool may initially identify the starting words to be dropped by identifying the first line of the target paragraph in the target text field, identifying the (e.g., configured) number of starting words to drop, and applying a (e.g., selected) character style to the starting words. The size and location of the empty space for the drop word can be determined in various ways. For example, vertex and/or edge coordinates may be calculated using a coordinate system of the target text field or digital document/design. In some embodiments involving horizontal text, the length of the empty space is computed as the length of the stylized starting word(s), plus the length of a subsequent terminating space (e.g., when the option is selected), and corresponding edge locations are determined relative to an origin in a corner of the target text field. In some embodiments, edge locations for the other dimension of the empty space (e.g., height) are computed by looking up corresponding line coordinates for the lines below the starting line where text should be excluded (e.g., to cover lines 2 through the specified number of lines to drop). The identified edge locations may be used to identify corresponding vertices, and the edges/vertices are used to create an invisible text exclusion zone with a size and location corresponding identified the empty space. In some embodiments, the text exclusion zone is not exposed, so the user cannot view, select, or otherwise directly interact with it.

The text exclusion zone can be used to update the target paragraph and target text field in various ways. For example, in some embodiments that define tiles where text can flow, the tiles are trimmed to exclude portions that overlap with the text exclusion zone. In another example, the tiles are flagged to indicate portions that overlap with the text exclusion zone. As such, the target paragraph can be recomposed using the updated tiles. In some cases, if the target paragraph was previously composed with an initial allocation of text to tiles and the drop word effect serves to shorten some of tiles, the target paragraph may need to be recomposed to reflow text that no longer fits in the shorter tiles into tiles of the subsequent lines. As such, the text from the target paragraph can be reflowed into the updated tiles, and any necessary reflow may be performed on the composition of the remaining portions of the target paragraph and target text field to complete the drop word effect. In some embodiments, when the option to apply the drop word effect to the current paragraph style is selected, the process is repeated for all paragraphs with the same style to automatically create the drop word effect for any paragraph with the same style.

In some embodiments, one or more inspectors (e.g., classes) monitor and detect changes that trigger an adjustment to the text exclusion zone and/or a recomposition. For example, in some embodiments, when an inspector detects an edit to text in the paragraph (e.g., a user adds or removes text, changes text style), changes line formatting (e.g., line spacing), and/or other changes, an adjustment to the text exclusion zone (e.g., updating the existing zone, creating a new zone and deleting the old one) and a recomposition are triggered. However, for some types of changes, the text exclusion zone may not need to be updated. For example, in some situations, resizing the text field may change how many lines are flowing in the field without affecting the text exclusion zone. As such, for edits like this or other types of edits, a corresponding inspector may simply trigger a recomposition. These are just a few examples, and other variations are contemplated with the scope of the present disclosure.

As such, using implementations described herein, a user can easily and efficiently configure and apply a drop word effect. In some cases, a user can even replicate the effect across multiple paragraphs that have different text content, without the need to configure each instance individually. In some embodiments, the drop word tool described herein exposes a number of configurable parameters (e.g., through a menu of drop word options) that dramatically simplifies the process of setting up a drop word. By providing centralized access to a set of configurable drop word parameters, the present techniques provide a streamlined user interface and therefore improve the efficiency with which users interact with a computer. For example, users no longer need to navigate a variety of tools, menus, objects, or other options to design an inefficient and unstable effect. Furthermore, by providing a dedicated drop word tool, the present techniques provide a more stable and efficient software implementation for configuring a drop word effect than in prior techniques. For example, since the present drop word tool does not rely on placing additional tabs or spaces in the text stream, a drop word can be configured in a way that maintains the integrity of text stream and that flows with the text, unlike prior techniques. Moreover, the present techniques can be adapted to any text direction, including vertical typesetting (e.g., Japanese), right-to-left typesetting (e.g., Hebrew, Persian, Arabic), or left-to-right typesetting (e.g., Roman), and are especially helpful for Hebrew typesetting where the drop word effect is commonly used to emphasize starting words and accommodate the vowels that appear beneath Hebrew characters. As such, the present techniques provide a consistent, stable, and scalable solution that allows users to easily apply a drop word effect throughout a document, layout, or other design.

Example Digital Typesetting Environment

Figure 2:
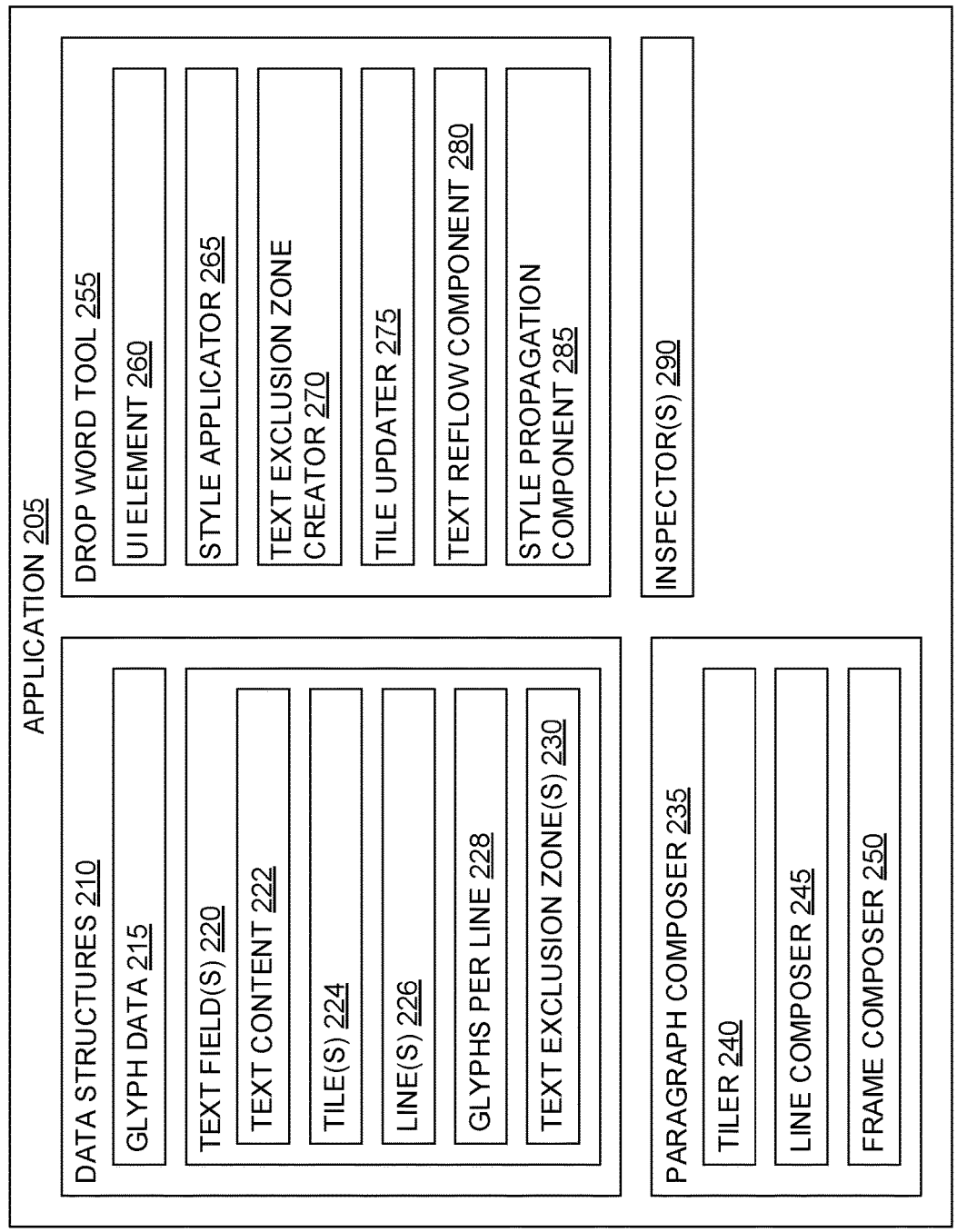
FIG. 2 is a block diagram of an example computing system for generating a drop word effect, in accordance with some embodiments.

Referring now to FIG. 2, a block diagram of example environment suitable for use in implementing embodiments of the invention is shown. Generally, the environment is suitable for digital typesetting, and, among other things, facilitates generation of a drop word effect. The environment includes user device 200, which may be any kind of computing device capable of facilitating generation of a drop word effect. For example, in an embodiment, user device 200 is a computing device such as computing device 1400, as described below with reference to FIG. 14. In embodiments, user device 200 can be a personal computer (PC), a laptop computer, a workstation, a mobile computing device, a PDA, a cell phone, or the like. User device 200 may be in communication with one or more computing devices such as a server (not shown in FIG. 2) through a network, which may include, without limitation, one or more local area networks (LANs) and/or wide area networks (WANs). Such networking environments are commonplace in offices, enterprise-wide computer networks, intranets, and the Internet.

As illustrated in FIG. 2, user device 200 includes drop word tool 255. Generally, drop word tool 255 generates a drop word effect using one or more user-supplied parameters. Drop word tool 255, or some portion thereof, may be incorporated, or integrated, into an application or an add-on or plug-in to an application. The application may generally be any application capable of facilitating digital design, digital typesetting, word processing, and/or the like, and may be a stand-alone application, a mobile application, a web application, or the like. In some implementations, the application comprises a web application, which may run in a web browser, and may be hosted at least partially server-side. In addition, or instead, the application may comprise a dedicated application. In some cases, the application may be integrated into the operating system (e.g., as a service). In the embodiment illustrated in FIG. 2, drop word tool 255 is illustrated as part of application 205, an example of which is ADOBE INDESIGN®, which is a desktop publishing and typesetting software application. Additionally or alternatively, drop word tool 255, or some portion thereof, may be integrated into an operating system (e.g., as a service), a server (e.g., a remote server), and/or some other device or component.

Generally, any allocation of functionality may be implemented across any number of devices. In the example illustrated in FIG. 2, application 205 and drop word tool 255 are illustrated as being installed on user device 200. In some embodiments, application 205 and/or drop word tool 255 may be hosted at least partially server-side. In another example, application 205 and/or drop word tool 255 (or some portion thereof) may be installed on some other device, or integrated into some other common application executable on some other device. Although embodiments are described with respect to an application(s), generally any of the functionality described herein may additionally or alternatively be integrated into an operating system (e.g., as a service), a server (e.g., a remote server), a distributed computing environment (e.g., as a cloud service), and/or otherwise. These are just examples, and any suitable allocation of functionality among these or other devices may be implemented within the scope of the present disclosure.

At a high level, application 205 uses one or more data structures 210 to represent, text, text formatting, and/or text layout in an digital document or design. In the example illustrated in FIG. 2, data structures 210 include representations of glyph data 215 and one or more text field 220, where each text field 220 includes representations of text content 222, one or more lines 226 segmenting the text field into bands, one or more tiles 224 indicating areas of the lines where text content 222 can flow, an arrangement and allocation of a portion of text content 222 to lines 226 (e.g., glyphs per line 228), and text exclusion zone(s) 230. Generally, paragraph composer 235 of application 205 composes text content 222 into lines 226 of text field 220, generating or updating the glyphs per line 228. One or more inspectors 290 of application 205 monitor for and detect certain types of changes (e.g., such as changes to text context 222) that trigger paragraph composer 235 to recompose text content 222 into lines 226. Although the components of application 205 are illustrated as part of application 205, some or all of the components may reside in storage accessible to application 205 (e.g., storage of user device 200).

Figure 3:
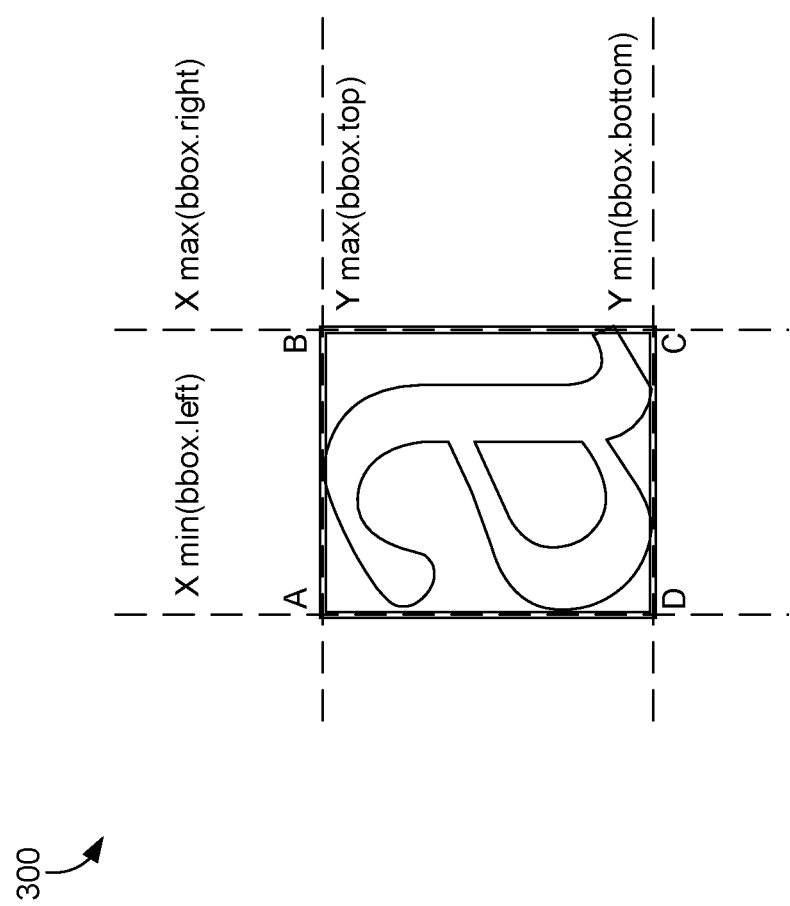
FIG. 3 is an illustration of an example glyph bounding box, in accordance with some embodiments.

More specifically, glyph data 215 represents the available glyphs for a particular font. Generally, a font represents a typeface with a given size and style. A typeface, like Times, includes the letters, numbers, and symbols that make up a design of type. A glyph is a shape in a font that is used to represent a character code on screen or paper. The most common example of a glyph is a letter, but the symbols and shapes in a font like ITC Zapf Dingbats also are glyphs. In some embodiments, glyph data 215 includes a representation, for each glyph, of any number of characteristics of the glyph sufficient to define its shape, outline, internal spacing, bounding box, and/or other elements. FIG. 3 is an illustration of an example glyph bounding box 300 for an example glyph, in accordance with some embodiments. In an example embodiment, glyph data 215 includes a representation of an identification attribution (e.g., a glyph ID), height, and width for each glyph. As such, a glyph ID may be used to look up the height and width (e.g., in points, pixels, or some other unit) for any particular glyph from glyph data 215, and the height and width may be used to determine coordinates for the four corners of a bounding box for the glyph (vertices ABCD in FIG. 3).

In some embodiments, application 205 includes various tools that accept inputs creating and arranging text content 222, text field(s) 220, and/or graphics for a digital document or design. In some embodiments in which text content 222 is entered into a text field 220, paragraph composer 235 composes text content 222 into one or more line(s) 226 of text field 220. In some cases, for each line, paragraph composer 235 creates a data structure or other representation of the line and its characteristics (e.g., line 226), such as the position of the line in text field 220 and/or the digital document or design, the number of glyphs in the line, an indicator of whether the line includes a line break, the position of a line break in the line, and/or the like. In some embodiments, this information is stored in a structure referred to as a WaxLine, and a WaxLine is created for each line of text in text field(s) 220.

In some embodiments, paragraph composer 235 composes a paragraph of text content 222, by arranging text content 222 into lines 226 to fit a layout in the digital document or design using any known technique. For example, in some embodiments, paragraph composer 235 accesses text content 222, accesses glyph data 215 for each glyph in the text content 222, creates one or more lines 226 (e.g., the number of lines to fit the glyphs in text content 222, some initialized number of lines), determines areas in the lines 226 where glyphs can flow (e.g., tile(s) 224), and allocates the glyphs in text content 222 to the lines 226 (e.g., inserting line breaks after the last word that fits on line). In some cases, a user input or other event may cause a change to text content 222 or other attributes, and the change is detected and used (e.g., by inspector(s) 290) to trigger paragraph composer 235 to reevaluate the composition of the paragraph (for some or all lines 226). For example, inserting one character into a paragraph could potentially result in changes to any or all of the line breaks in the paragraph, including those preceding the inserted character. As such, paragraph composer 235 may reevaluate any impacted lines and/or the remaining lines in text field 220 and reflow text content 222 in response to a detected change.

In the embodiment illustrated in FIG. 2, paragraph composer 235 includes tiler 240, line composer 245, and frame composer 250. At a high level, tiler 240 determines the areas (tiles) in a line where glyphs can flow and manages the tiles for a given text field. Line composer 245 flows text into a tile associated with a line until the tile is full or an end-of-line glyph or character is encountered. Frame composer 250 successively determines when line recompositions are needed (e.g., based on an overflow of text from a prior line composition) and triggers line composer 245 to recompose those lines until text content 222 is fully composed (e.g., without any overflow from any given line in text field 220).

At a high level, tiler 240 effectively controls the content area bounds of each line by determining the areas of a line where glyphs can flow. In some cases, in the absence of text exclusion zone(s) 230, the area of tile may coincide with the area of a corresponding line. In some embodiments, tiler 240 generates and/or maintains a representation of the available tiles (e.g., tiles 224) in a line 226 and/or in text field 220. In some embodiments, tiler 240 arranges tiles 224 into an ordered representation, and retrieves or otherwise identifies tiles that meet specified size requirements for particular text to be flowed. For example, paragraph composer 235 may determine a minimum tile width (e.g., based on a minimum glyph length) and height (e.g., based on a specified leading) and cause tiler 240 to iterate through tiles 224 in order to find a tile that meets the specified dimensions.

By way of non-limiting example, in some embodiments involving Roman text, a tile must be wide enough to receive one glyph plus any left and right line indents that are active. In some embodiments, the minimum glyph width is approximated to be the same as a specified leading. The minimum tile height may depend on the line being composed. In some cases, minimum tile height is set to leading, except for the first line in a text field, in which the minimum tile height may depend on text attributes of text in the first line (e.g., ascent, cap height, leading). The top of a tile may be identified by coordinates (e.g., relative to the text field, relative to the document/design) which indicate the top of the area into which text can flow. In some embodiments, if tiler 240 does not find a large enough tile in the current line to meet all requirements, tiler 240 may advance to the next line and seek for a large enough tile, and so on. If no tiles can meet the request, tiler 240 may return tiles into which overset text can flow.

Figure 4:
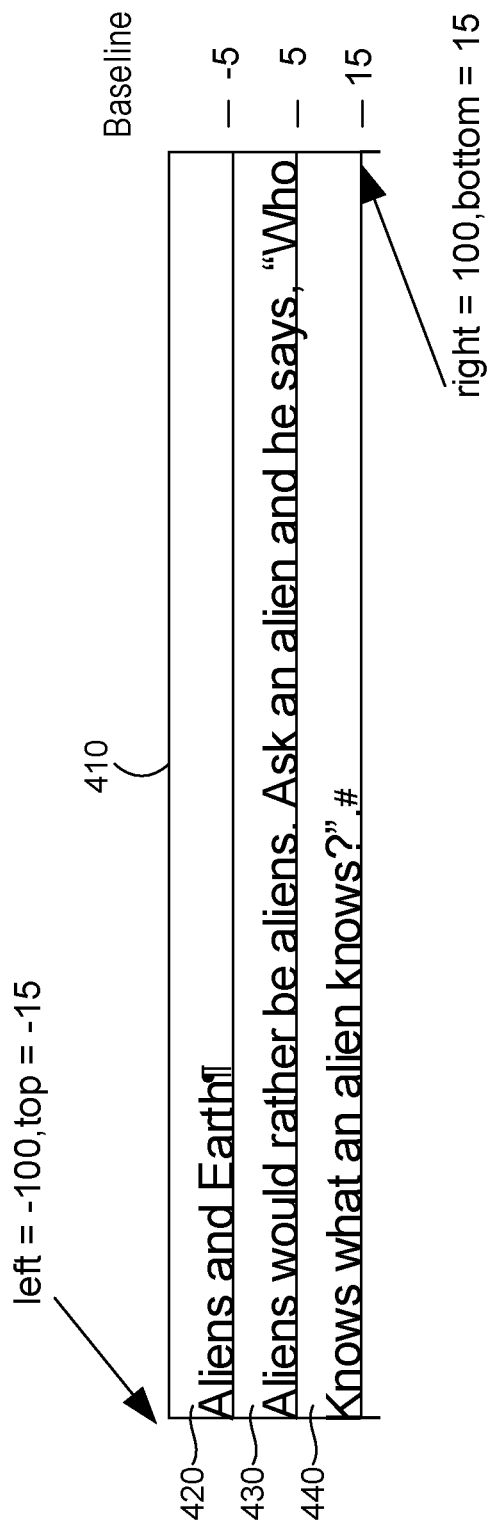
FIG. 4 is an illustration of an example text field with three lines of text, in accordance with some embodiments.

FIG. 4 is an illustration of an example text field 410 with three lines 420, 430, and 440, in accordance with some embodiments. In this example, text field 410 is 200 points wide and 30 points deep, with its baseline grid shown. This example is based on 8-point Times Regular with 10-point leading, and the first baseline offset (e.g., the height of the first line) for the field is set to leading (but the figure is not necessarily to scale). In some embodiments, when text content with the same appearance throughout is flowed into the text field, the distance between the baselines of succeeding lines of text is set to the leading. In order to determine a minimum tile size, paragraph composer 235 may examine an active font and text style and calculate the corresponding minimum depth and width for a tile. In an example with 8-point text, 10-point leading, no line indents, the minimum height and width is 10 points.

Returning to FIG. 2, paragraph composer 235 may then request that tiler 240 return tiles of the required depth and minimum width, starting at a given position (e.g., for Roman text, the top left corner of the current line). In the example illustrated in FIG. 4, tiler 240 may return a tile corresponding to line 420, and line composer 245 may flow text into the tile (defining glyphs per line 228) until the tile is full or an end-of-line glyph is encountered. Thus, line composer 245 may choose where to break the line, and may create a corresponding data structure (e.g., line 226) for the determined range of text the line will display. Frame composer 250 successively asks line composer 245 to recompose lines 430 and 440 using y-coordinates of −5 and 5, respectively, for the starting position for each line, until the text of text field 410 is fully composed.

In many cases, there is only one tile on a line. However, in some cases, one or more text exclusion zones 230 may be defined. For example, text wrap or nonrectangular fields may cause breaks in the line where text should flow. As such, tiler 240 may identify and/or generate one or more text exclusion zones 230. For example, tiler 240 may identify field insets, a design element that overlaps with a text field and has a text wrap applied, non-rectangular text fields, and/or other situations, and generate a representation of a corresponding text exclusion zone 230. Generally, text exclusion zones 230 may be represented by a flag on an impacted tile or a band covering an impacted tile (e.g., indicating text cannot be flowed into the entire width of a line), an area in the line where text cannot be flowed (e.g., portions that that overlap with a text exclusion zone), and/or otherwise. In some embodiments, tiler 240 trims tiles 224 to exclude portions that overlap with one of text exclusion zones 230. Additionally or alternatively, when tiler 240 is asked to return an identification of an area where text may flow, tiler 240 may initially look up tiles 224 and return a reduced area that excludes text exclusion zones 230 (e.g., for flagged tiles), without overwriting the representation of tiles 224. As such, tiler 240 may return a representation of an area where text may flow, excluding any text exclusion zones 230.

Figure 6:
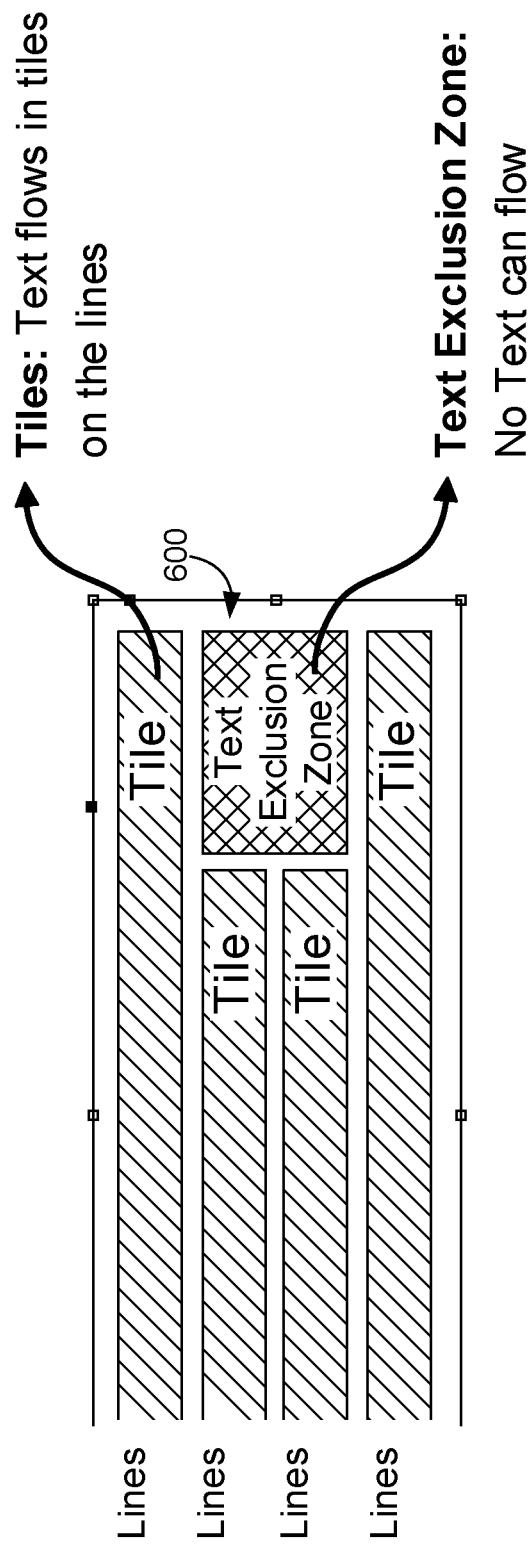
FIG. 6 is an illustration of an example text field with tiles and a generated text exclusion zone for a drop word, in accordance with some embodiments.

At a high level, drop word tool 255 generates a drop word effect using one or more user-supplied parameters. In an example embodiment involving Roman text, drop word tool 255 calculates the width of the dropped word based on a user input specifying the number of words to be dropped, the number of lines to drop the word(s), whether or not to include a terminating space in the dropped word width, the character style to be applied to the dropped word(s), and/or whether or not to scale the dropped word(s) to avoid conflicts with lower lines. Thus, drop word tool 255 may trim tiles 224 or otherwise identify areas where text may flow by carving out a text exclusion zone corresponding to the calculated width of the dropped word(s) and the number of lines to drop, and trigger a recomposition that flows text into the identified areas. FIG. 6 is an illustration of an example text field 600 with tiles and a generated text exclusion zone for a drop word, in accordance with some embodiments involving right-to-left text. By generating a text exclusion zone and reflowing text into trimmed tiles and/or the portions of tiles that do not overlap with the text exclusion zone, there is no need to add spaces or indents into the text stream, and no need to apply a text wrap.

In the embodiment illustrated in FIG. 2, drop word tool 255 includes user interface element 260, style applicator 265, text exclusion zone creator 270, tile updater 275, text reflow component 280, and style propagation component 285. Generally, user interface element 260 includes one or more interaction elements that accept inputs entering one or more drop word parameters. Style applicator 265 applies a designated text style (e.g., based on the user-supplied parameters) to a designated number of starting words of a paragraph. Text exclusion zone creator 270 creates a text exclusion zone for the empty space below a drop word (e.g., based on the user-supplied parameters). Tile updater 275 updates tiles 224 based on the created text exclusion zone. Text reflow component 280 triggers paragraph composer 235 to reflow text in the paragraph using the applied text style and updated tiles 224 (and/or text exclusion zones 230). Style propagation component 285 identifies all paragraphs with the same style and triggers drop word tool 255 to apply a drop word effect for any paragraph with the same style (e.g., when the option to apply the drop word effect to the current paragraph style is selected).

User interface element 260 causes presentation of one or more interaction elements (such as a menu of drop word options) that accept user input specifying one or more parameters for configuring a drop word for a selected text field or paragraph. For example, a selection tool of application 205 may be used to select a particular text field or paragraph, and a menu of drop word options may be activated (e.g., by navigating one or more menus to arrive at an option that activates the menu of drop word options, by selecting a drop word tool from a tool bar, etc.).

Figure 5:
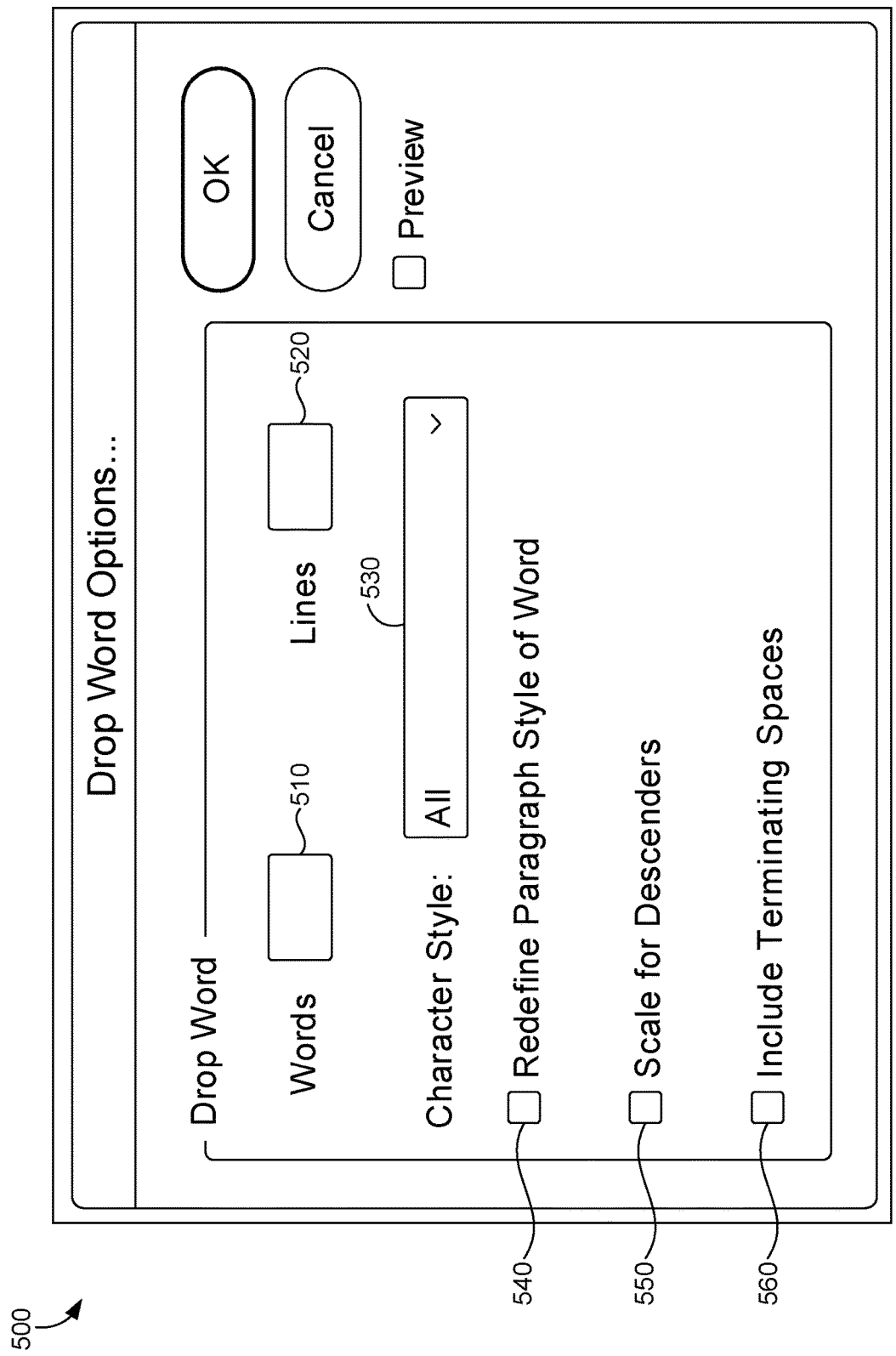
FIG. 5 is an illustration of an example menu of drop word options, in accordance with some embodiments.

FIG. 5 is an illustration of an example menu 500 of drop word options, in accordance with some embodiments. Generally, menu 500 exposes a number of configurable parameters or settings that allow a user to control different elements of a drop word effect. For example, field 510 accepts a numerical input specifying the number of starting words to be dropped. Field 520 accepts a numerical input specifying the number of lines to drop (e.g., how deep the empty space should be). Drop-down menu 530 accepts an input selecting a character style to apply to the starting word(s) to be dropped. Check box 540 accepts an input toggling an option (e.g., a Boolean value) to apply the drop word settings to the current paragraph style and automatically replicate the drop word effect to any paragraph with the same style. Check box 550 accepts an input toggling an option (e.g., a Boolean value) to automatically scale the starting word(s) to prevent its descenders from colliding with the next line. Check box 560 accepts an input toggling an option (e.g., a Boolean value) to include the terminating space in the length of the empty space of the drop word. Once the user selects the desired options, the user can select "ok" (or some other interaction element) to apply the selected settings to a selected (target) text field or paragraph.

Initially to apply the selected drop word settings, in some embodiments, various information may be accessed, loaded, generated, and/or cached to improve performance. For example, drop word tool 255 may load, generate, and/or cache one or more data structures representing a target text field (e.g., text field 220)—such as text content 222, tile(s) 224, line(s) 226, glyphs per line 228—and/or values of the drop word settings. For example, drop word tool 255 may access glyph data 215 and reduce it to one or more data structures that store a representation of the bounding box (e.g., height and width) and glyph ID for each glyph. Additionally or alternatively, drop word tool 255 may populate one or more data structures with an ordered representation of the bounding boxes and glyph IDs for each glyph of text context 222, for example, indexed by line. By way of nonlimiting example, drop word tool 255 may generate an n-dimensional array, where n is the total number of line(s) 226, and each dimension stores a representation of the bounding boxes and glyph IDs for each glyph of text context 222 in a corresponding line (e.g., glyphs per line 228). In embodiments where glyph data 215 stores a substantial amount of character level data, loading, generating, and/or caching an ordered representation of bounding boxes and/or glyph IDs can improve performance by avoiding the need to repetitively search through all the character level data.

In some embodiments, drop word tool 255 supports multiple text directions. As such, drop word tool 255 may read the writing direction of the target text field or paragraph. For example, in some embodiments, the target text field may include a text direction property, which drop word tool 255 may read. In another example, text direction may be set as a document property, which drop word tool 255 may read. Based on the text direction, drop word tool 255 may select a corresponding set of rules and computations to generate a drop word effect with an empty space below the drop word and aligned with the left edge of left-to-right text (e.g., Roman text), below the drop word and aligned with the right edge of right-to-left text (e.g., Hebrew), to the left of the drop word and aligned with the top edge of top-to-bottom+right-to-left text (e.g., Japanese), to right of the drop word and aligned with the top edge of top-to-bottom+left-to-right text, etc. Although some examples are described below with respect to right-to-left text, these and other example may be adapted to other text directions within the scope of the present disclosure.

Figure 7:
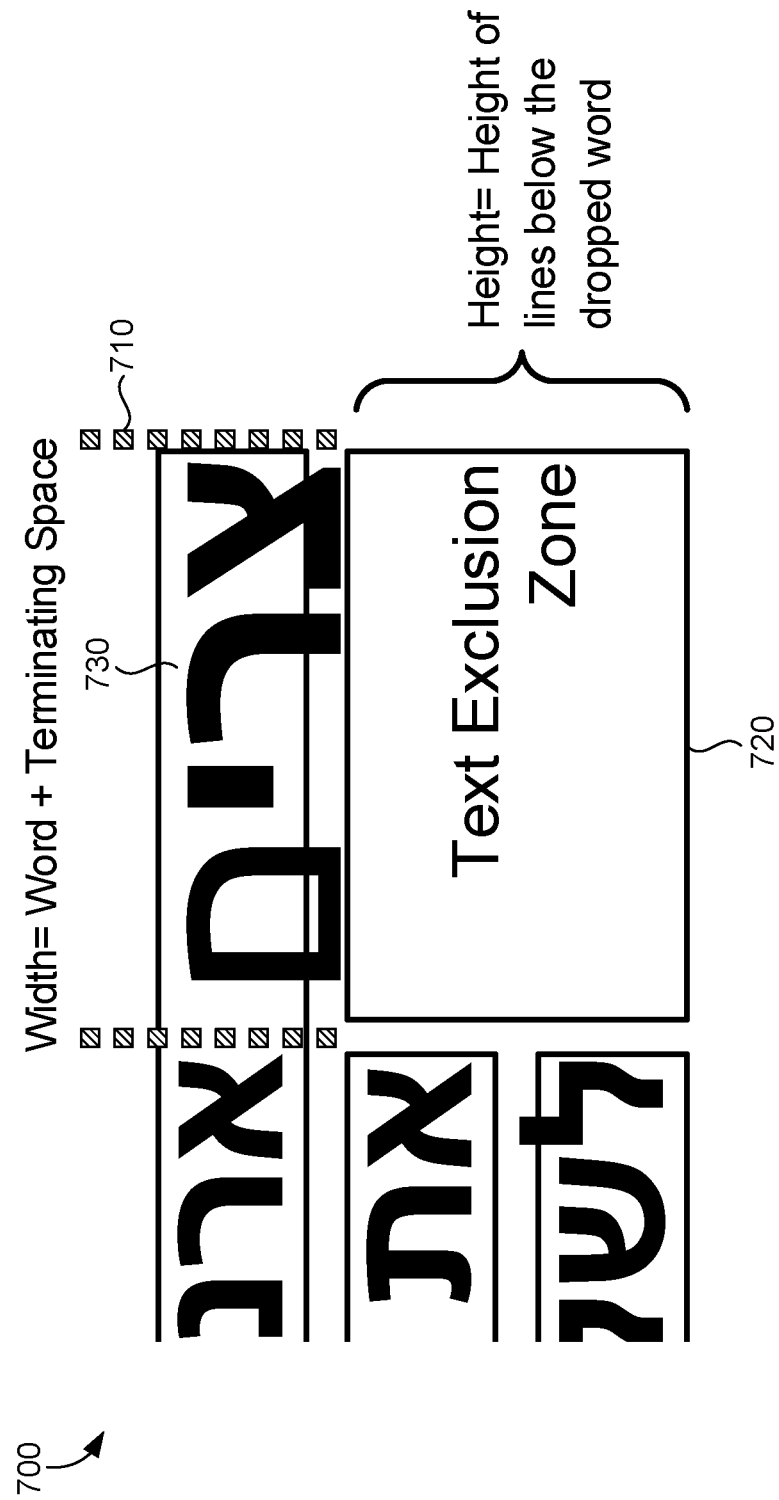
FIG. 7 is an illustration of an example drop word effect with a text exclusion zone that accommodates a terminating space, in accordance with some embodiments.

Style applicator 265 applies a designated text style to the word or words to be dropped in the first line of a target text field or paragraph. In some embodiments that accept user-supplied values for the number of words to be dropped and the character style, style applicator 265 reads the number of words to be dropped, reads text content 222 to identify the number of dropped words (e.g., by identifying a range of text starting at the beginning of text content 222 and extending to the end of the designated number of starting words, for example, terminating upon reaching a number of space characters corresponding to the designated number of words), and applies the selected character style to those words. Generally, style applicator 265 may use any known technique to apply and/or trigger application of a selected text or character style, for example, at the glyph level, and application of a character style may cause changes to any number of text features at the glyph level (e.g., color, size, shape, etc.). Some changes like changes to font size can impact the size of a glyph's bounding box, so in some embodiments, style applicator 265 updates one or more corresponding data structures (e.g., glyphs per line 228) to reflect any changes to the ordered representation of glyph bounding boxes for each glyph of text context 222. FIG. 7 is an illustration of an example drop word effect 700, in accordance with some embodiments. In this example, a character style has been applied to starting word 730 such that the glyphs in starting word 730 are a larger font size than the rest of the text in line. This is just an example implementation, and other variations are possible within the scope of the present disclosure.

Text exclusion zone creator 270 creates a text exclusion zone for the empty space below a drop word (for horizontal text), for example, based on the user-supplied parameters. Generally, the dimensions and location of the text exclusion zone may depend on the text direction, the number of dropped words, the size of the dropped word(s) (e.g., for horizontal text, the width of the dropped word(s)), whether or not to include a terminating space, and/or line number (e.g., line height). In the example illustrated in FIG. 7, text exclusion zone creator 270 calculates and creates text exclusion zone 720 below starting word 730 (i.e., the dropped word). In this example, the height of text exclusion zone 720 is calculated as the height of the lines below starting word 730 (e.g., the height of each line times the designated number of lines to drop), and the width of text exclusion zone 720 is calculated as the width 710 of the glyphs in the starting word 730 (e.g., read and/or calculated from glyphs per line 228). In some embodiments, text exclusion zone creator 270 includes the width of the terminating space after the starting word 730 in the width 710 (e.g., when a corresponding option has been selected).

Figure 8:
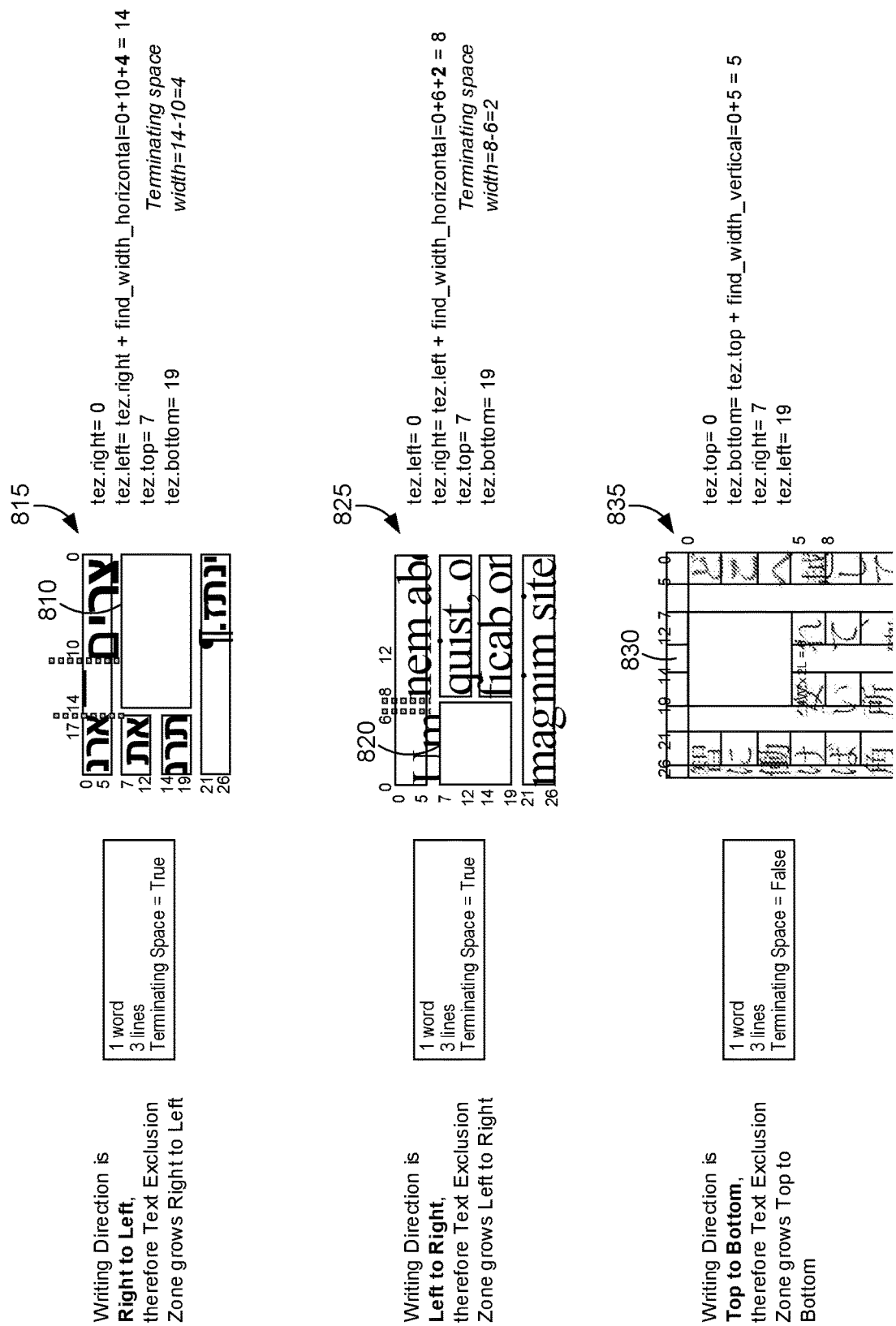
FIG. 8 is an illustration of example text exclusion zones for different text directions, in accordance with some embodiments.

FIG. 8 is an illustration of example text exclusion zones for different text directions, in accordance with some embodiments. For example, text exclusion zone 810 is an example text exclusion zone for right-to-left text (e.g., Hebrew). In this example, since the text direction is right-to-left and top-to-bottom, the origin of the illustrated coordinate system is in the top right corner of target paragraph 815. This example involves a single word dropped three lines (e.g., so the empty space below the word extends to two additional lines beyond the one line that contains the word), and the option to include the terminating space in the dropped word has been enabled. The size and location of text exclusion zone 810 (tez) may be identified in any suitable manner, for example, based on vertex and/or edge coordinates. For example, the right edge (tez.right) and left edge (tez.left) may be identified by horizontal coordinates, and the top edge (tez.top) and bottom edge (tez.bottom) may be identified by vertical coordinates. In this example, the right edge is set to the right edge of target paragraph 815 (tez.right=0). The left edge is set to the position of the right edge (0), plus the width of the dropped word (10), plus the width of the terminating space (4) (tez.left=14). The top edge is set to the top of the second line (tez.top=7). The bottom edge is set to the bottom of the third line (tez.bottom=19).

Text exclusion zone 820 is an example text exclusion zone for left-to-right text (e.g., Roman languages). In this example, since the text direction is left-to-right and top-to-bottom, the origin of the illustrated coordinate system is in the top left corner of target paragraph 825. This example involves a single word dropped three lines (e.g., so the empty space below the word extends to two additional lines beyond the one line that contains the word), and the option to include the terminating space in the dropped word has been enabled. In this example, the left edge is set to the left edge of target paragraph 825 (tez.left=0). The right edge is set to the position of the left edge (0), plus the width of the dropped word (6), plus the width of the terminating space (2)

(tez.right=8). The top edge is set to the top of the second line (tez.top=7). The bottom edge is set to the bottom of the third line (tez.bottom=19).

Text exclusion zone 830 is an example text exclusion zone for top-to-bottom text (e.g., Japanese). In this example, since the text direction is top-to-bottom and left-to-right, the origin of the illustrated coordinate system is in the top right corner of target paragraph 835. Furthermore, this example involves a single word dropped three lines (e.g., so the empty space below the word extends to two additional lines beyond the one line that contains the word), and the option to include the terminating space in the dropped word has been disabled. The size and location of text exclusion zone 830 (tez) may be identified in any suitable manner, for example, based on vertex and/or edge coordinates. In this example, the top edge is set to the top edge of target paragraph 835 (tez.top=0). The bottom edge is set to the position of the top edge (0), plus the height of the dropped word (5) (tez.bottom=5). The right edge is set to the right edge of the second line (tez.right=7). The left edge is set to the left edge of the third line (tez.left=19).

Returning to FIG. 2, in some embodiments, once the size and position of the text exclusion zone are calculated, tile updater 275 updates tiles 224 and/or text exclusion zone(s) 230 based on the new text exclusion zone created for the drop word. For example, tile updater 275 may add the newly created text exclusion zone to text exclusion zone(s) 230 and/or cause tiler 240 to trim tile(s) 224 to exclude portions that overlap with the newly created text exclusion zone (or with any text exclusion zone(s) 230). Once tiles 224 and/or text exclusion zone(s) 230 are updated, text reflow component 280 triggers paragraph composer 235 to reflow text in the target text field or paragraph using the updated tiles 224 and/or text exclusion zone(s) 230. For example, text reflow component 280 may flag the number of dropped lines, cause line composer 245 to reflow text in those lines, and/or cause frame composer 250 to recompose the rest of the target text field or paragraph.

Note that applying a text style that increases the size of the starting words may increase their size so they extend outside the tile on the first line. In some embodiments, the designated starting words from the first line are permitted to extend into the text exclusion zone, as the empty space created by the text exclusion zone is intended make room for those starting words. As such, recomposing text may permit descenders from the first line to enter the text exclusion zone.

As such, a desired drop word effect is automatically applied to a target text field or paragraph. In embodiments where the option to apply the drop word effect to the current paragraph style is selected, style propagation component 285 identifies all text fields and/or paragraphs with the same style and triggers drop word tool 255 to apply a drop word effect for any paragraph in the document or design with the same style. In embodiments where text fields include on or more paragraphs, style propagation component 285 may iterate over all impacted text fields, and all impacted paragraphs in those text fields.

Figure 9:
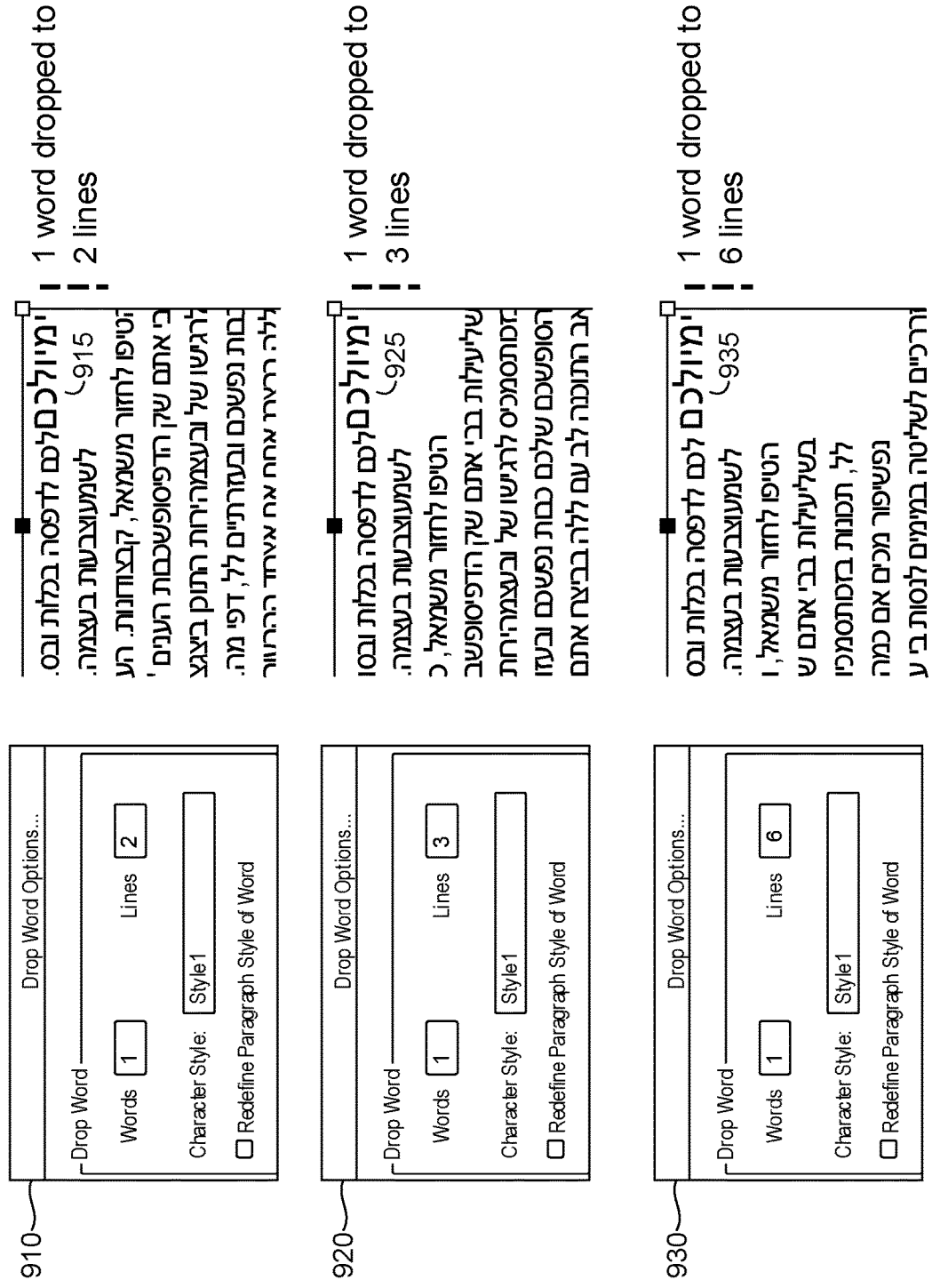
FIG. 9 is an illustration of example drop word effects with different amounts of dropped lines, in accordance with some embodiments.
Figure 10:
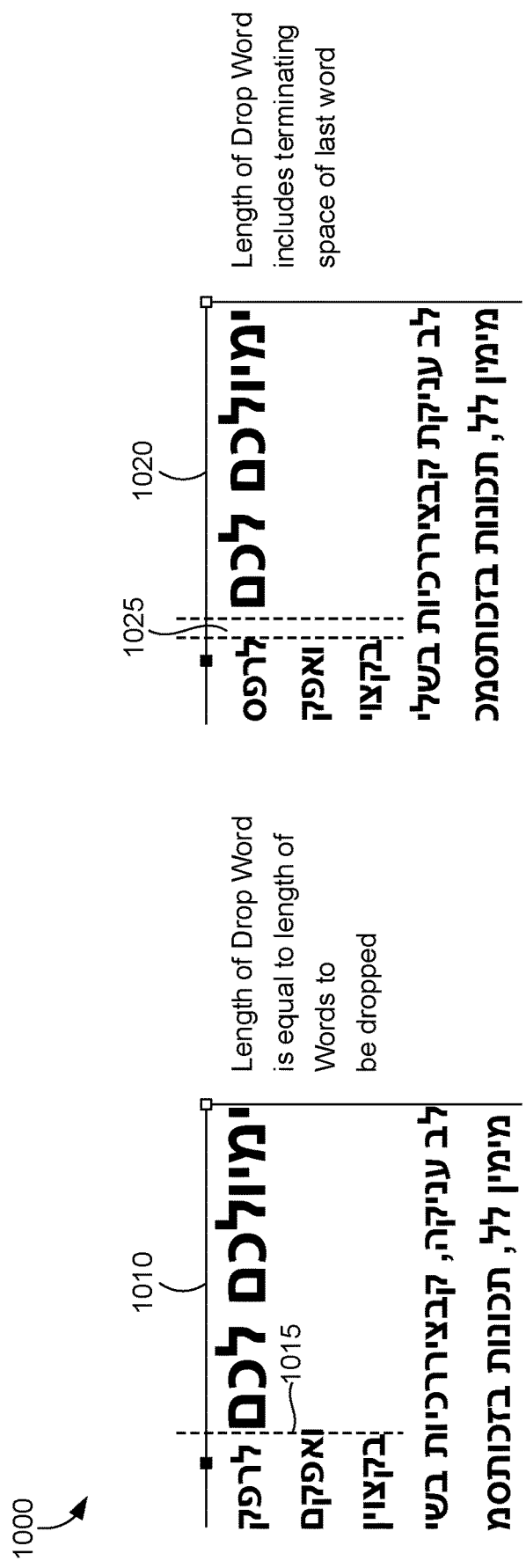
FIG. 10 is an illustration of example drop word effects with and without accommodating a terminating space, in accordance with some embodiments.

FIG. 9 is an illustration of example drop word effects with different amounts of dropped lines, in accordance with some embodiments. For example, drop word options 910 may be selected to automatically drop one word two lines (drop word 915). Drop word options 920 may be selected to automatically drop one word by three lines (drop word 925). Drop word options 930 may be selected to automatically drop one word by six lines (drop word 935). FIG. 10 is an illustration of example drop word effects with and without accommodating a terminating space, in accordance with some embodiments. For example, target paragraph 1010 is illustrated with a drop word that does not include a terminating space when identifying the location of left edge 1015 of the empty space, while target paragraph 1020 is illustrated with a drop word that does include terminating space 1025. These are just a few examples, and other variations are contemplated within the scope of the present disclosure.

Example Flow Diagrams

Figure 11:
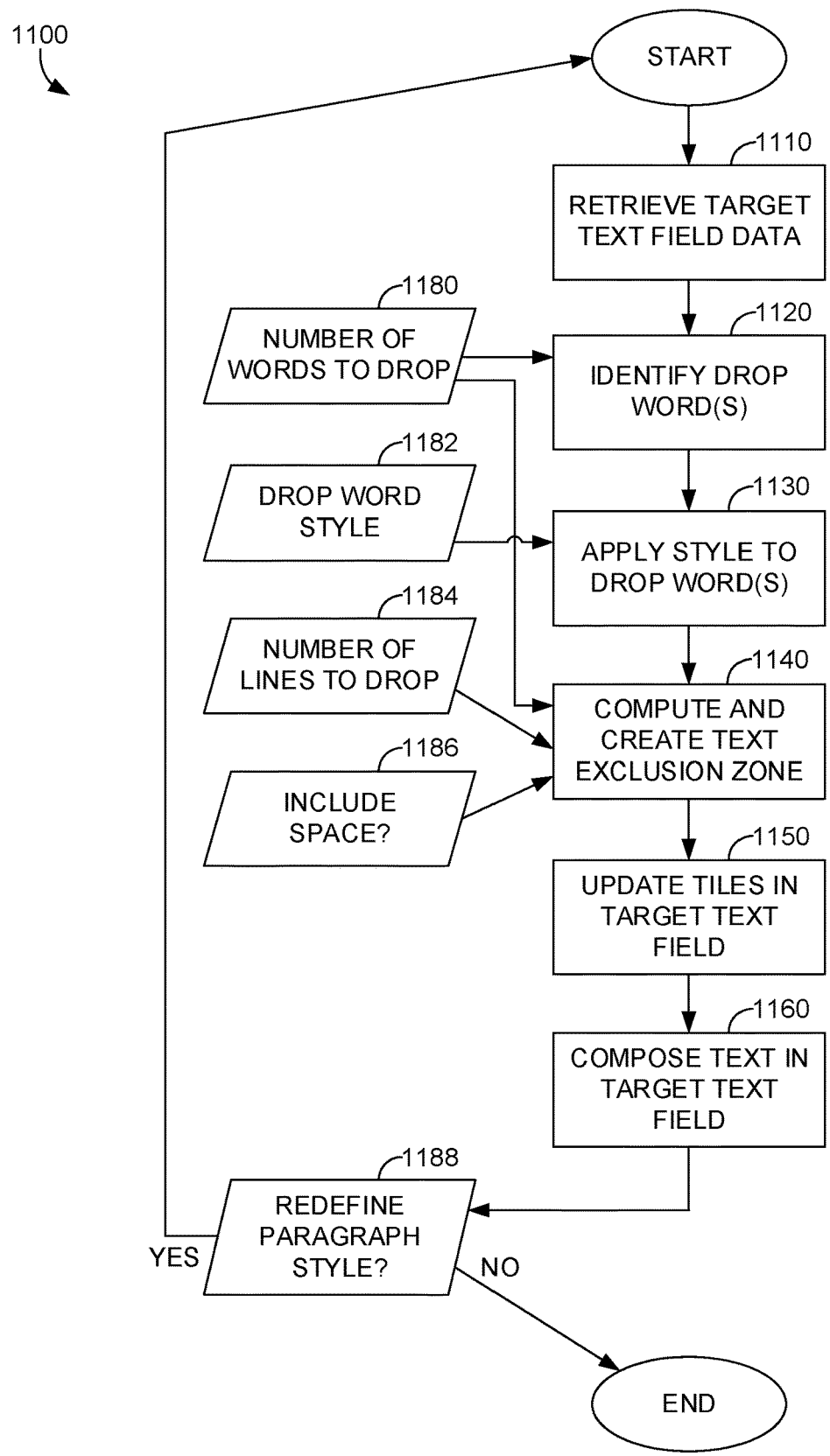
FIG. 11 is a flow diagram showing a method for generating a drop word effect from user-supplied parameters, in accordance with some embodiments.
Figure 12:
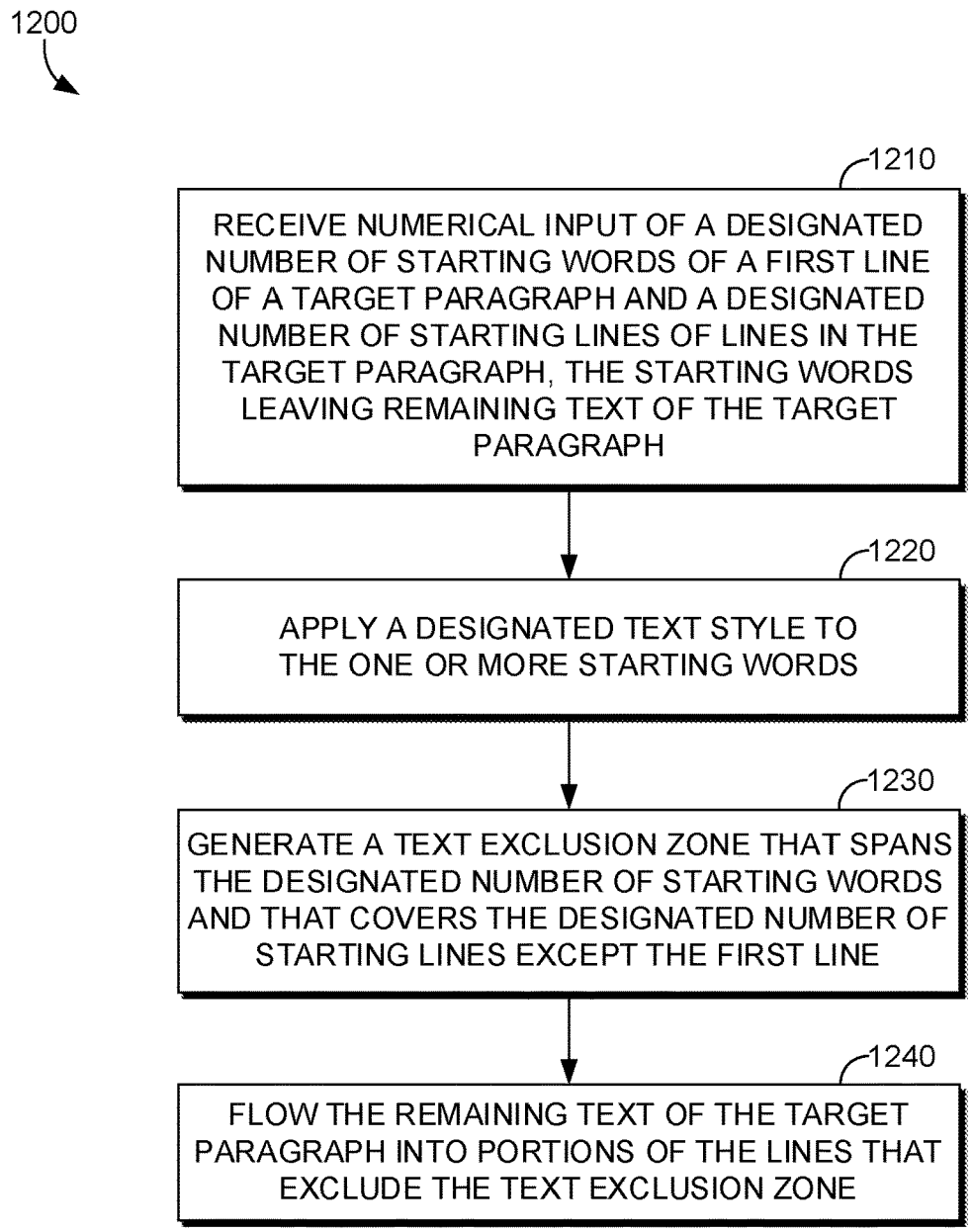
FIG. 12 is a flow diagram showing a method for generating a drop word effect based on a designated number of starting words and a designated number of starting lines, in accordance with some embodiments.
Figure 13:
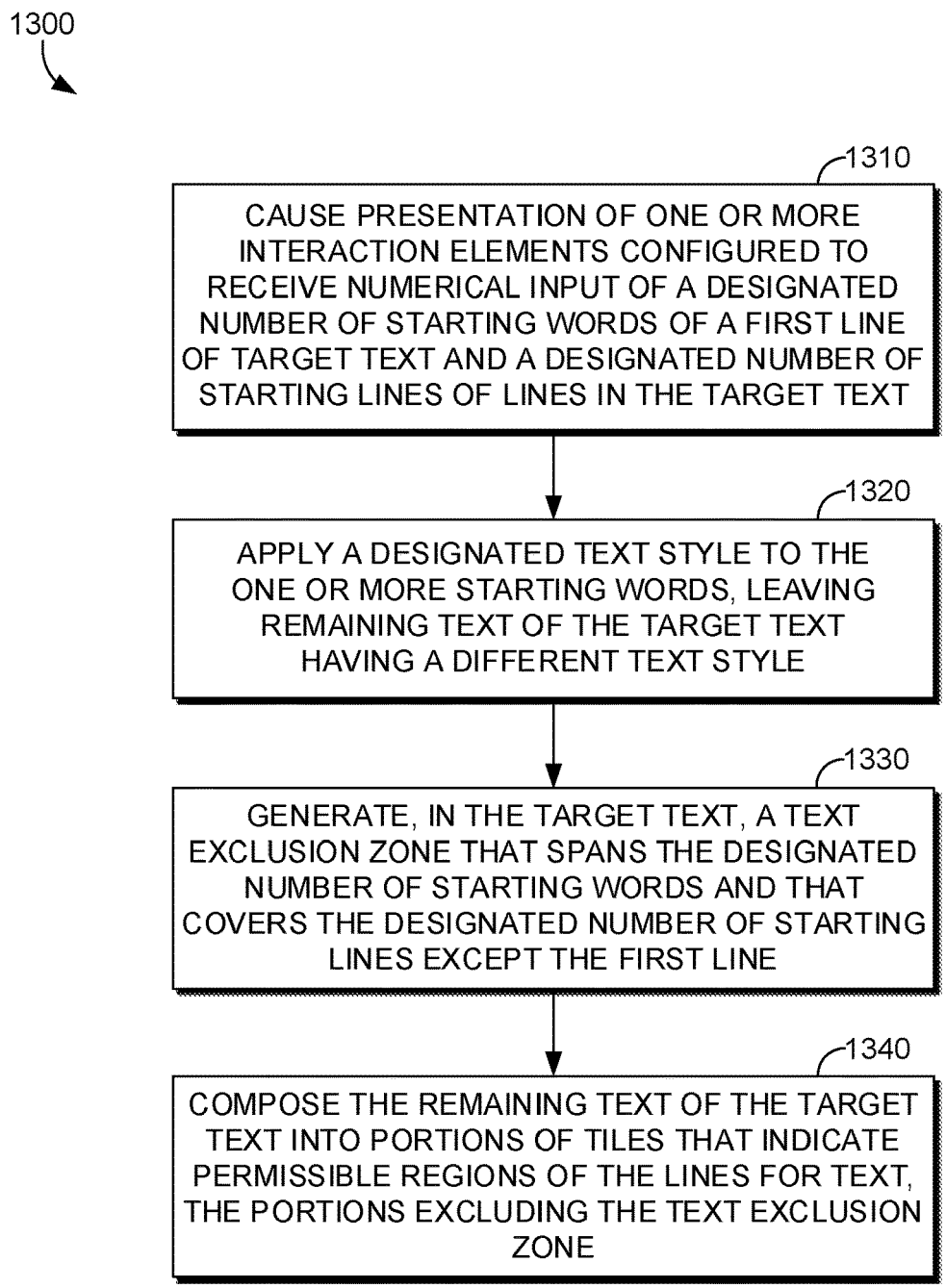
FIG. 13 is a flow diagram showing a method for composing text into portions of tiles that exclude a text exclusion zone, in accordance with some embodiments.

With reference now to FIGS. 11-13, flow diagrams are provided illustrating methods for generating a drop word effect. Each block of the methods 1100, 1200, and 1300 and any other methods described herein comprise a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

Turning initially to FIG. 11, FIG. 11 illustrates a method 1100 for generating a drop word effect from user-supplied parameters, in accordance with embodiments described herein. In this embodiment, user-supplied parameters are represented in the left column by parallelograms. In some embodiments, method 1100 is triggered upon receiving a command to apply a drop word effect to a target text field. Initially, at block 1110, target text field data is retrieved. For example, as a pre-processing step, drop word tool 255 of FIG. 2 may load, generate, and/or cache one or more data structures representing the target text field, such as text content 222, tile(s) 224, line(s) 226, and/or glyphs per line 228.

At block 1120, the word or words to be dropped are identified. The number 1180 of words to drop may be a user-supplied parameter, which is retrieved and used to identify that number of starting words from the target text field. In the example illustrated in FIG. 2, style applicator 265 reads the number of words to be dropped, reads text content 222 to identify the number of drop words (i.e., the first n words in the target text field and/or target paragraph terminating at the nth space character).

At block 1130, a designated text or character style is applied to the drop word(s). The drop word style 1182 may be a user-supplied parameter, which is retrieved and applied to the drop word(s). In the example illustrated in FIG. 2, style applicator 265 applies a designated character style to the drop word(s).

At block, 1140, a text exclusion zone is computed and created. The size and location of the text exclusion zone may depend on the text direction, the number 1180 of words to drop, the number 1184 of lines to drop, and a property 1186 indicating whether or not to include a terminating space in the drop word. Number 1180 of words to drop, number 1184 of lines to drop, and/or property 1186 indicating whether or not to include a terminating space in the drop word may be user-supplied parameters, which are retrieved and used to calculate and create the text exclusion zone. In the example illustrated in FIG. 2, text exclusion zone creator 270 creates a text exclusion zone for the empty space below the drop word (e.g., for Roman text).

At block 1150, the tiles in the target text field are updated based on the newly created text exclusion zone. In the example illustrated in FIG. 2, tile updater 275 may add the newly created text exclusion zone to text exclusion zone(s)

230 and/or cause tiler 240 to trim tile(s) 224 to exclude portions that overlap with the newly created text exclusion zone (or with any text exclusion zone(s) 230).

At block 1160, the text in the target text field is composed. In the example illustrated in FIG. 2, text reflow component 280 triggers paragraph composer 235 to reflow text in the target text field or paragraph to fit within the updated tiles 224 and/or by preventing text from being rendered in text exclusion zone(s) 230.

Option 1188 is a Boolean property that specifies whether or not to refine the current paragraph style to include the selected drop word options. If option 1188 is set to false (or no), method 1100 ends. If option 1188 is set to true (or yes), the current paragraph style is updated, all text fields and/or paragraphs with the same style are identified, and method 1100 repeats for each text fields and/or paragraphs with the same style to apply a drop word effect to those text fields and/or paragraphs.

Turning now to FIG. 12, FIG. 12 is a flow diagram showing a method for generating a drop word effect based on a designated number of starting words and a designated number of starting lines, in accordance with some embodiments. Initially at block 1210, numerical input is received. The numerical input includes a designated number of starting words of a first line of a target paragraph and a designated number of starting lines of lines in the target paragraph. The starting words leave remaining text of the target paragraph. At block 1220, a designated text style is applied to the one or more starting words. At block 1230, a text exclusion zone that spans the designated number of starting words and that covers the designated number of starting lines except the first line is generated. At block 1240, the remaining text of the target paragraph is flowed into portions of the lines that exclude the text exclusion zone.

Turning now to FIG. 13, FIG. 13 is a flow diagram showing a method for composing text into portions of tiles that exclude a text exclusion zone, in accordance with some embodiments. Initially at block 1310, presentation of one or more interaction elements is caused. The one or more interaction elements are configured to receive numerical input of a designated number of starting words of a first line of target text and a designated number of starting lines of lines in the target text. At block 1320, a designated text style is applied to the one or more starting words, leaving remaining text of the target text having a different text style. At block 1330, a text exclusion zone is generated in the target text. The text exclusion zone spans the designated number of starting words and that covers the designated number of starting lines except the first line. At block 1340, the remaining text of the target text is composed into portions of tiles that indicate permissible regions of the lines for text. The portions of the tiles exclude the text exclusion zone.

Example Operating Environment

Figure 14:
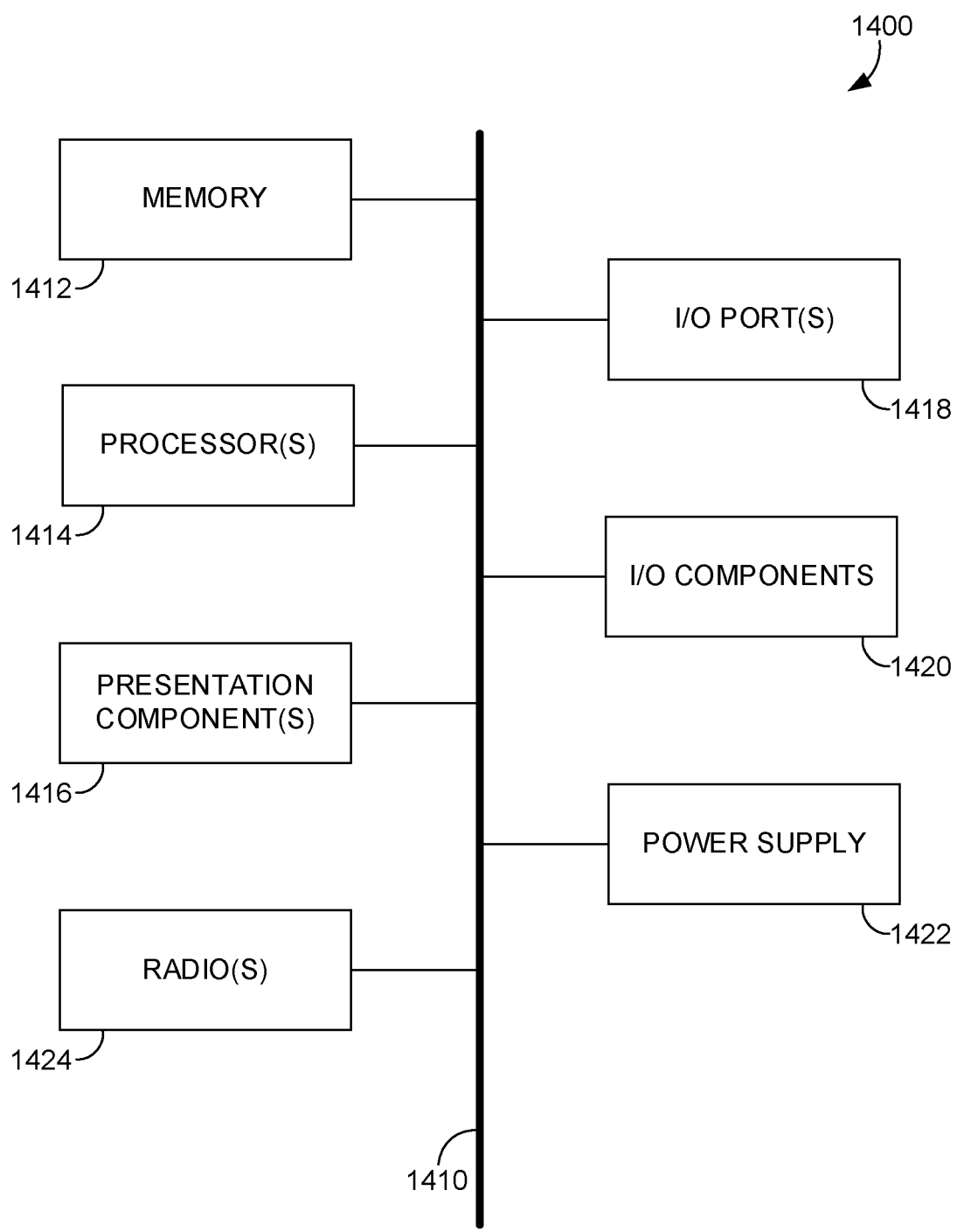
FIG. 14 is a block diagram of an example computing environment suitable for use in implementing embodiments of the present invention.

Having described an overview of embodiments of the present invention, an example operating environment in which embodiments of the present invention may be implemented is described below in order to provide a general context for various aspects of the present invention. Referring now to FIG. 14 in particular, an example operating environment for implementing embodiments of the present invention is shown and designated generally as computing device 1400. Computing device 1400 is but one example of a suitable computing environment and is not intended to suggest any limitation as to the scope of use or functionality of the invention. Neither should computing device 1400 be interpreted as having any dependency or requirement relating to any one or combination of components illustrated.

The invention may be described in the general context of computer code or machine-useable instructions, including computer-executable instructions such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 14, computing device 1400 includes bus 1410 that directly or indirectly couples the following devices: memory 1412, one or more processors 1414, one or more presentation components 1416, input/output (I/O) ports 1418, input/output components 1420, and illustrative power supply 1422. Bus 1410 represents what may be one or more busses (such as an address bus, data bus, or combination thereof). Although the various blocks of FIG. 14 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 14 is merely illustrative of an example computing device that can be used in connection with one or more embodiments of the present invention. Distinction is not made between such categories as "workstation," "server," "laptop," "hand-held device," etc., as all are contemplated within the scope of FIG. 14 and reference to "computing device."

Computing device 1400 typically includes a variety of computer-readable media. Computer-readable media can be any available media that can be accessed by computing device 1400 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1400. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1412 includes computer-storage media in the form of volatile and/or nonvolatile memory. The memory may be removable, non-removable, or a combination thereof. Example hardware devices include solid-state memory, hard drives, optical-disc drives, etc. Computing device 1400 includes one or more processors that read data from various entities such as memory 1412 or I/O components 1420. Presentation component(s) 1416 present data indications to a user or other device. Example presentation components include a display device, speaker, printing component, vibrating component, etc.

I/O ports 1418 allow computing device 1400 to be logically coupled to other devices including I/O components 1420, some of which may be built in. Illustrative components include a microphone, joystick, game pad, satellite dish, scanner, printer, wireless device, etc. The I/O components 1420 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of computing device 1400. Computing device 1400 may be equipped with depth cameras, such as stereoscopic camera systems, infrared camera systems, RGB camera systems, touchscreen technology, and combinations of these, for gesture detection and recognition. Additionally, the computing device 1400 may be equipped with accelerometers or gyroscopes that enable detection of motion. The output of the accelerometers or gyroscopes may be provided to the display of computing device 1400 to render immersive augmented reality or virtual reality.

Embodiments described herein support generation of a drop word effect. The components described herein refer to integrated components of drop word effect generation system. The integrated components refer to the hardware architecture and software framework that support functionality using the drop word effect generation system. The hardware architecture refers to physical components and interrelationships thereof and the software framework refers to software providing functionality that can be implemented with hardware embodied on a device.

The end-to-end software-based drop word effect generation system can operate within the drop word effect generation system components to operate computer hardware to provide drop word effect generation system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the drop word effect generation system components can manage resources and provide services for the drop word effect generation system functionality. Any other variations and combinations thereof are contemplated with embodiments of the present invention.

Having identified various components in the present disclosure, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations comprising:
   receiving numerical input of a designated number of starting words of a first line of a target paragraph and a designated number of starting lines of lines in the target paragraph, the designated number of starting words leaving remaining text of the target paragraph;
   applying a designated text style to the designated number of starting words;
   generating a text exclusion zone, that excludes spaces and tabs, that spans the designated number of starting words and that covers the designated number of starting lines except the first line; and flowing the remaining text of the target paragraph into portions of the lines that exclude the text exclusion zone.

2. The one or more computer storage media of claim 1, wherein flowing the remaining text to exclude the text exclusion zone creates a drop word effect, the operations further comprising causing presentation of a graphical menu that accepts input specifying configurable parameters for the drop word effect including the numerical input of the designated number of starting words and the designated number of starting lines.

3. The one or more computer storage media of claim 2, the operations further comprising generating the text exclusion zone without exposing the text exclusion zone for editing except through the graphical menu.

4. The one or more computer storage media of claim 1, the operations further comprising, prior to generating the text exclusion zone, caching an ordered representation of bounding boxes of glyphs in the target paragraph.

5. The one or more computer storage media of claim 1, wherein text direction of the target paragraph is horizontal and the text exclusion zone is below the designated number of starting words, or the text direction of the target paragraph is vertical and the text exclusion zone is left of the designated number of starting words.

6. The one or more computer storage media of claim 1, the operations further comprising receiving input setting a property value specifying whether to include a terminating space after the designated number of starting words, and generating a dimension of the text exclusion zone based on the property value.

7. The one or more computer storage media of claim 1, wherein flowing the remaining text to exclude the text exclusion zone creates a drop word effect, the operations further comprising receiving input setting a property value specifying whether to apply the drop word effect to all paragraphs with a same paragraph style as the target paragraph.

8. The one or more computer storage media of claim 1, the operations further comprising receiving input setting a property value specifying whether to automatically scale the designated number of starting words to avoid conflicts with text of other lines in the target paragraph, wherein applying the designated text style to the designated number of starting words is based on the property value.

9. A computerized method, the method comprising:
causing presentation of one or more interaction elements configured to receive numerical input of a designated number of starting words of a first line of target text and a designated number of starting lines of lines in the target text;
applying a designated text style to the designated number of starting words, leaving remaining text of the target text having a different text style;
generating, without modifying a text stream of the target text, a text exclusion zone that spans the designated number of starting words and that covers the designated number of starting lines except the first line; and
composing the remaining text of the target text into portions of tiles that indicate permissible regions of the lines for text, the portions excluding the text exclusion zone.

10. The computerized method of claim 9, wherein composing the remaining text to exclude the text exclusion zone creates a drop word effect, further comprising causing presentation of a graphical menu that accepts input specifying configurable parameters for the drop word effect including the numerical input of the designated number of starting words and the designated number of starting lines, the graphical menu including the one or more interaction elements.

11. The computerized method of claim 10, further comprising generating the text exclusion zone without exposing the text exclusion zone for editing except through the graphical menu.

12. The computerized method of claim 9, further comprising, prior to generating the text exclusion zone, caching an ordered representation of bounding boxes of glyphs in the target text.

13. The computerized method of claim 9, wherein text direction of the target text is horizontal and the text exclusion zone is below the designated number of starting words, or the text direction of the target text is vertical and the text exclusion zone is left of the designated number of starting words.

14. The computerized method of claim 9, further comprising receiving input setting a property value specifying whether to include a terminating space after the designated number of starting words, and generating a dimension of the text exclusion zone based on the property value.

15. The computerized method of claim 9, wherein composing the remaining text to exclude the text exclusion zone creates a drop word effect, the method further comprising receiving input setting a property value specifying whether to apply the drop word effect to all text with a same paragraph style as the target text.

16. The computerized method of claim 9, further comprising receiving input setting a property value specifying whether to automatically scale the designated number of starting words to avoid conflicts with text of other lines in the target text, wherein applying the designated text style to the designated number of starting words is based on the property value.

17. A computer system comprising:
one or more hardware processors and memory configured to provide computer program instructions to the one or more hardware processors;
a drop word tool configured to use the one or more hardware processors to perform operations in response to receiving a command to apply to a target text field a drop word effect to a designated number of starting words of a first line of the target text field and a designated number of starting lines of lines in the target text field, the operations comprising:
caching an ordered representation of bounding boxes of glyphs of the target text field;
applying a designated text style to the designated number of starting words, leaving remaining text of the target text field having a different text style;
generating a text exclusion zone that spans the designated number of starting words and that covers the designated number of starting lines except the first line; and
composing, using the ordered representation of the bounding boxes, the remaining text of the target text field into portions, of tiles associated with the lines that exclude the text exclusion zone.

18. The computer system of claim 17, wherein the drop word tool is configured to receive input setting a property value specifying whether to include a terminating space after the designated number of starting words, and to generate a dimension of the text exclusion zone based on the property value.

19. The computer system of claim 17, wherein the drop word tool is configured to receive input setting a property value specifying whether to apply the drop word effect to all text fields with a same paragraph style as the target text field.

20. The computer system of claim 17, wherein the drop word tool is configured to receive input setting a property value specifying whether to automatically scale the designated number of starting words to avoid conflicts with text of other lines in the target text field, wherein applying the designated text style to the designated number of starting words is based on the property value.

* * * * *